March 31, 1964
R. PARR ETAL
3,127,324
NUCLEAR REACTORS
Filed Nov. 1, 1957
4 Sheets-Sheet 1
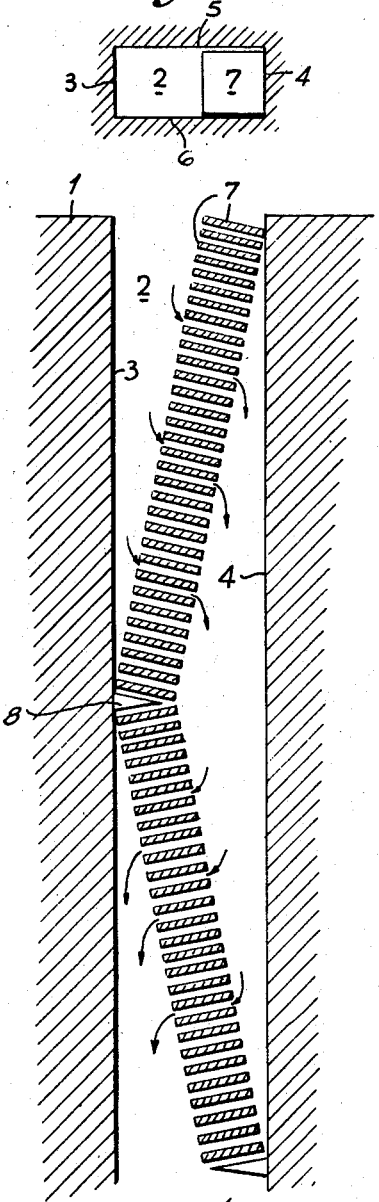
Fig. 1A.
Fig. 1B.
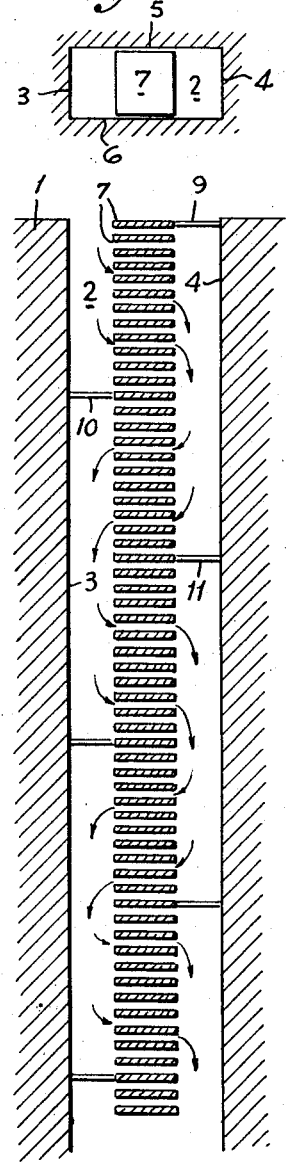
Fig. 2A.
Fig. 2B.
RONALD PARR
JOHN ANTHONY WYNNE HUGGILL
Inventors
Attorneys March 31, 1964  R. PARR ETAL  3,127,324
NUCLEAR REACTORS
Filed Nov. 1, 1957  4 Sheets-Sheet 2
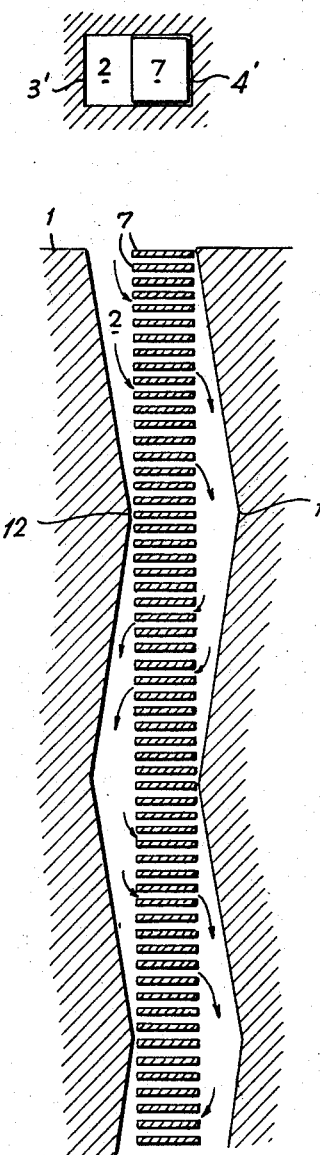
Fig. 3A.
Fig. 3B.
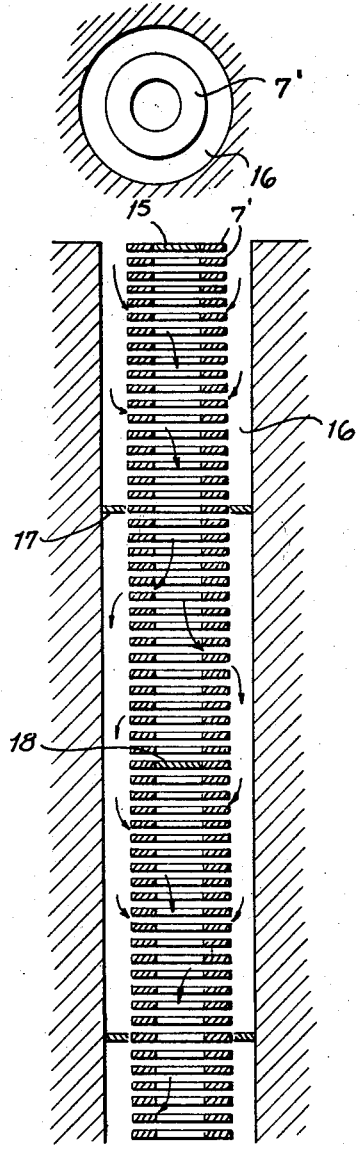
Fig. 4A.
Fig. 4B
RONALD PARR
JOHN ANTHONY WYNNE HUGGILL
Inventors
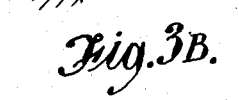
Attorneys March 31, 1964 R. PARR ETAL 3,127,324
NUCLEAR REACTORS
Filed Nov. 1, 1957 4 Sheets-Sheet 3

RONALD PARR
JOHN ANTHONY WYNNE HUGGILL
Inventors

Attorneys

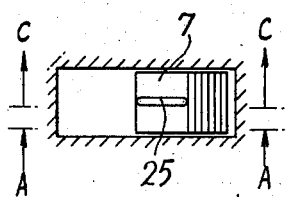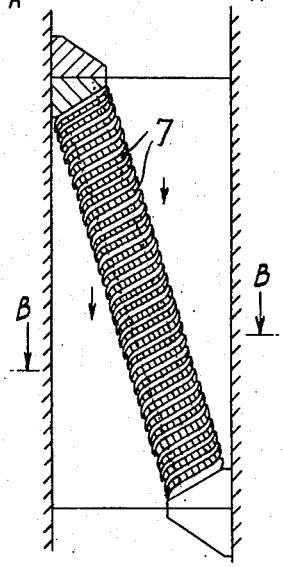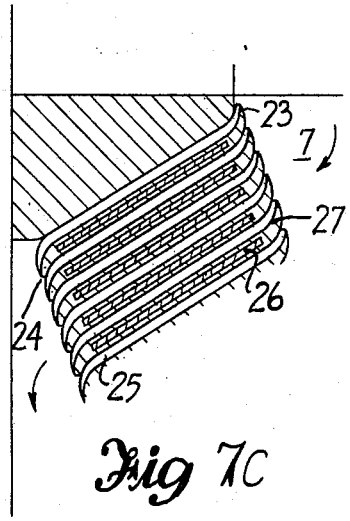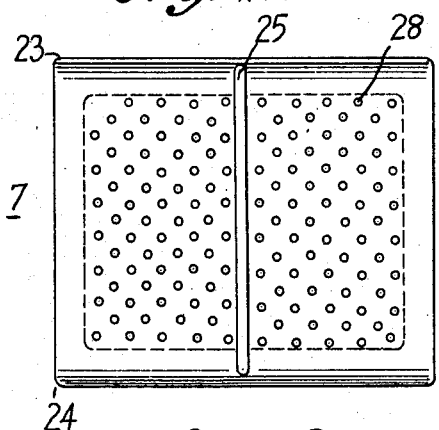
RONALD PARR
JOHN ANTHONY WYNNE HUGGILL
Inventors
Attorneys

United States Patent Office 3,127,324
Patented Mar. 31, 1964

3,127,324
NUCLEAR REACTORS
Ronald Parr, Urmston, and John Anthony Wynne Huggill, Heaton Moor, Stockport, England, assignors to A.E.I.-John Thompson Nuclear Energy Company Limited, London, England, a British company
Filed Nov. 1, 1957, Ser. No. 694,003
Claims priority, application Great Britain Nov. 1, 1956
6 Claims. (Cl. 176—59)

This invention relates to nuclear reactors of the heterogenous type and is more particularly concerned with the arrangement of the fuel elements. Normally the fuel elements are in the form of rods extending either vertically or horizontally through the reactors core. In order to obtain a more economical power production from a reactor it is necessary to obtain a high heat rating per unit quantity of fuel and this clearly involves a high rate of transfer of heat from the fuel to the coolant and of course an adequate rate of circulation of the coolant. At the same time, however, it is desirable to maintain a high concentration of fuel since if the concentration is too low it is necessary to enrich the fuel. With a view to obtaining a high transfer of heat from the fuel to the coolant the fuel rods, as above referred to, have been formed with fins. However, this construction only gives a limited improvement in heat transfer. It has been proposed to increase the rate of heat transfer to the coolant by forming the fuel elements of parallel plates extending longitudinally along the fuel channel. However, in such a case the coolant flow path through the fuel becomes very long and in order to obtain sufficient flow it is necessary that the spacing between the plates is made large. This may reduce the concentration of the fuel to such an extent that appreciable enrichment of the fuel becomes necessary.

The present invention comprises a nuclear reactor of the kind having the fuel elements arranged in fuel channels through which the coolant flows and in which the fuel elements are formed of a stack of parallel plates which plates extend transversely or obliquely across the fuel channel and are spaced apart to provide coolant channels between the plates and in which the arrangement is such that the coolant has to traverse a plurality of coolant channels in series during its passage through the reactor.

It will be appreciated that with such an arrangement the length of each coolant channel will be relatively short so that the spacing apart of the plates can be made small and hence a high fuel concentration obtained. At the same time by causing the coolant to traverse several coolant channels successively it is possible to obtain a sufficient temperature differential between the incoming coolant and the outgoing coolant for thermo-dynamic efficiency without undue mixing of coolant streams at different temperatures.

In arrangements in which coolant flows along the fuel channels it may be caused to flow from side to side of a channel as it traverses the length and during each successive pass to flow through coolant passages between the fuel plates so that the coolant follows a substantially zig zag path. This may be effected by employing a fuel channel of rectangular section and tilting the stack obliquely across the fuel channel alternately in one direction and the other so that the stack follows a zig zag path between the opposite walls of the channel. Alternatively, the stack may extend linearly along a channel and the zig zag flow of coolant may be obtained by baffles or by recessing the opposite sides of the fuel channel in alternatively opposite directions. Another arrangement consists in forming the fuel elements from annular discs into a hollow cylindrical stack and arranging baffles so that the coolant has to flow alternatively from the inside to the outside and from the outside to the inside of the stack.

The invention is also applicable to arrangements in which the coolant flows along passages extending transversely of the fuel passages.

The invention is applicable to reactors employing a gas coolant or a liquid coolant such as water or heavy water or liquid metal or an organic fluid such as one of the phenyl groups. The fuel elements may be uranium plates provided with a magnesium or beryllium coating and normally these would only require either slight or no enrichment.

According to a further feature the canning has a roughened surface to assist heat transfer.

In cases in which a beryllium coating is employed this may be pressed around the uranium using a powder metallurgy process and the roughening formed during the pressing operation.

In order that the invention may be more clearly understood reference will now be made to the accompanying drawings, in which:

FIGS. 1A, 2A, 3A and 4A are plan views, and
FIGS. 1B, 2B, 3B and 4B are corresponding vertical sectional views of four different arrangements of fuel elements embodying the invention, the elevation views showing the top end of the fuel channel in each case.

FIGS. 7A, 7B and 7C are views corresponding to FIGS. 5A, 5B and 5C respectively but showing a modified construction and FIG. 8 is a plan view of a fuel element showing a further modification.

Figure 5A:
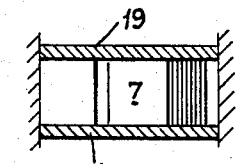
FIG. 5A is a plan view.

In FIGS. 1A and 1B the reference 1 indicates part of a solid reactor core, e.g., a graphite moderated reactor, and 2 is a fuel channel. As appears in FIG. 1A the fuel channel is of a rectangular section having end walls 3 and 4 and side walls 5 and 6. The stack of fuel elements 7 is supported by side plates 29 and extends obliquely across the fuel passage the top end of the first section abutting against the wall 4 and the bottom end of the section abutting against the wall 3 at the support 8. The second section extends obliquely in the opposite direction from the wall 3 to the wall 4. Thus, coolant flowing downwardly along the fuel passage is constrained to follow in the direction indicated by the arrows, i.e., it will first traverse the top section from left to right and then the second section from right to left, as seen in FIG. 1B.

FIGS. 2A and 2B show an alternative arrangement in which the stack in this case is arranged vertically but horizontal baffles 9, 10 and 11 . . . cause the coolant flow to follow a zig zag path. Thus, coolant entering the top of the fuel passage will flow down over the wall 3. It will then be caused by the baffle 10 to flow from left to right through the coolant passages to the wall 4. It will flow down this wall until it meets the baffle 11 where it will again be caused to flow from right to left back again to the wall 3, the number of traverses through the stack being selected as required for purposes of efficiency of heat transfer.

FIGS. 3A and 3B show an alternative arrangement to FIGS. 2A and 2B in which, instead of employing baffles, the fuel passage is recessed laterally. Thus, at the top of the fuel channel the wall 3' is spaced from the plate 7 but extends obliquely towards the stack of fuel elements until it meets them at the point 12. Similarly, the wall 4' extends from the right edge of the top fuel plate at the top of the stack obliquely outwards to the point 13 where it is spaced laterally from the stack. Below the points 12 and 13 the wall 3' recedes from the stack whereas the wall 4' approaches the stack. Clearly the zig zag flow of gas will again be obtained. The side plates 29 should not extend laterally beyond the fuel plates in order that withdrawal of the fuel element sections can be made.

FIGS. 4A and 4B show a further arrangement in which the fuel channel is of circular section and the fuel elements are formed of a hollow cylindrical stack of annular elements 7', supported by longitudinal ribs 30. The top of the internal passage 14 is closed by a baffle 15. Thus the coolant entering the top of the stack will flow down the outside space 16. Its flow down the outside of the stack will be limited by an annular baffle 17 so that it will be caused to flow inwardly through the coolant passages between the fuel element plates into the internal passage 14. From here it can flow downwards until it meets the baffle 18 and before this point it flows radially outwards through the coolant passages into the external space 16. Thus, between the baffles 15 and 17 the coolant will flow radially inward through the coolant passages and between the baffles 17 and 18 it will flow radially outwards. It will be appreciated that here again the number of traverses of coolant passages by coolant may be selective as required.

Figure 5B:
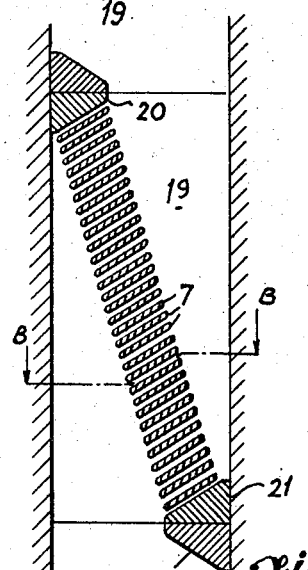
FIG. 5B is an elevational view in section illustrating the manner of constructing the fuel element of the kind shown in FIGS. 1A and 1B.
Figure 5C:
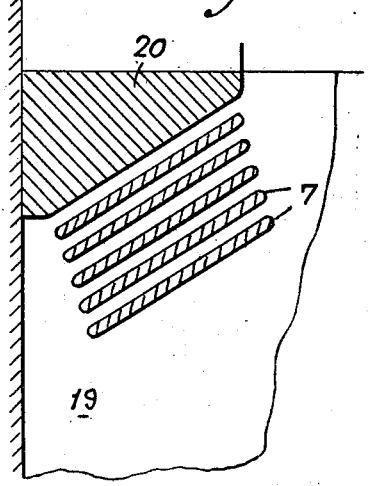
FIG. 5C is a detail elevational view.

FIGS. 5A, 5B and 5C illustrate one form of construction of fuel element stack embodying the invention. In the arrangement shown the stack comprises a pair of parallel plates 19 extending vertically and carrying the fuel elements which may be recessed in grooves in the faces of the plates 19. At the top end of each stack a block 20 and at the bottom end a block 21 extend laterally between the plates 19 for the purpose of strengthening the structure.

Figure 6:
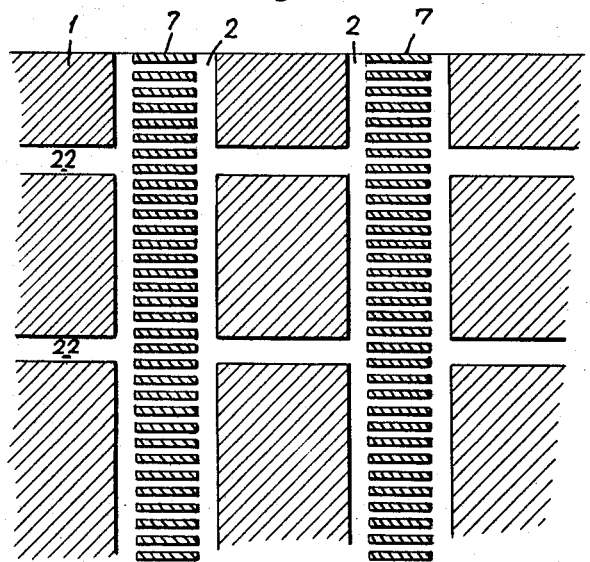
FIG. 6 is an alternative arrangement in which the coolant flows laterally across the fuel channels.

FIG. 6 shows another arrangement in which the fuel channels 2 extend vertically and the fuel plates are arranged in linear vertical stacks, as in the arrangements of FIGS. 2 and 3. In this case, however, the coolant passages 22 extend horizontally and intersect the fuel passages 2 at intervals. Clearly such an arrangement is equivalent to those previously described inasmuch as the coolant will flow through a number of coolant passages in sequence, although in this case the flow will not be zig zag.

FIGS. 7A, 7B and 7C show an arrangement which is similar to that shown in FIGS. 5A, 5B and 5C but the shape of the fuel elements 7 is modified. As is shown more clearly in FIG. 7C the leading and trailing edges (with respect to coolant flow) 23 and 24 of the fuel plates 7 are curved so as to assist the coolant flow.

In order to give strength to the fuel plates at high temperatures and to resist deformation under neutron bombardment the plates may be formed with ribs 25. These also serve as spaces to prevent closing up of the gaps under deformation.

Whilst in the drawing only one rib has been shown clearly there could be more than one.

FIG. 7C shows the fuel elements 26 encased in cans 27.

In cases in which beryllium is employed for the cans this can be pressed around the fuel by a powder metallurgy process.

During the pressing a roughened surface can be formed to assist the heat transfer.

FIG. 8 shows the surface formed with a series of hillocks 28. Clearly other surface formations can be used.

What we claim is:

1. In a nuclear reactor having a moderator core defining a substantially vertical fuel channel through which fluid coolant is passed in a longitudinal direction, a stack of plate-like fuel elements disposed in sections in the fuel channel, the plates of each section being in substantially parallel spaced relationship to each other, said stack being spaced from opposing portions of the wall of the channel and extending transverse the longitudinal axis thereof, and means disposed in the channel for so directing the fluid coolant through a longitudinally extending zig zag flow path between the opposing wall portions as to traverse the stack of fuel elements in the spaces separating pairs thereof.

2. A nuclear reactor according to claim 1 wherein said means includes means for mounting the sections on longitudinal axes extending oblique to the longitudinal axis of the channel, the longitudinal axis of each successive section sloping in the opposite direction from that above.

3. A nuclear reactor according to claim 1 wherein said means includes a series of baffles spaced at intervals and extending laterally across the spaces between each of the opposing wall portions and the stack, the intervals of one series being staggered with respect to the intervals of the other series.

4. A nuclear reactor according to claim 1 wherein said means includes a series of graded recesses spaced at intervals in each of the opposing wall portions, the intervals of one series being staggered with respect to the intervals of the other series.

5. A nuclear reactor according to claim 1 wherein the plate-like fuel elements are annular and said means includes a series of baffles closing the center openings of elements spaced at intervals from one another and a series of baffles spaced at intervals and extending laterally across the spaces between each of the opposing wall portions and the stack, the intervals of one series being staggered with respect to the intervals of the other series.

6. A nuclear reactor according to claim 1 wherein the edges of the plate-like fuel elements facing the opposing wall portions are so curved as to deflect the fluid coolant in directions inclined longitudinally of the channel.

References Cited in the file of this patent

UNITED STATES PATENTS

| | | |
|---|---|---|
| 2,687,876 | Hytte | Aug. 31, 1954 |
| 2,773,823 | Goett | Dec. 11, 1956 |
| 2,780,596 | Anderson | Feb. 5, 1957 |
| 2,782,158 | Wheeler | Feb. 19, 1957 |
| 2,790,760 | Powell | Apr. 30, 1957 |
| 2,799,642 | Hurwitz et al. | July 16, 1957 |
| 2,985,575 | Dennis et al. | May 23, 1961 |

OTHER REFERENCES

NAA–SR–1936, p. 12, September 1, 1957.
NAA–SR–1998, pp. 14–18, 21, 25, 30–35 and 40, November 15, 1957.
TID 5275 Research Reactors, pages 315–317.